Fig. 1

INVENTOR.
HOWARD L. McCOMBS JR.
BY
Gordon N. Chenez
AGENT

Fig. 2

INVENTOR.
HOWARD L. McCOMBS JR.
BY
AGENT

Fig. 3

INVENTOR.
HOWARD L. McCOMBS JR.
BY
Gordon H. Chaney
AGENT

Fig. 4

United States Patent Office 3,611,802
Patented Oct. 12, 1971

3,611,802
AFTERBURNER FUEL MANIFOLD
FLOW SENSOR
Howard L. McCombs, Jr., South Bend, Ind., assignor to
The Bendix Corporation
Filed Dec. 3, 1968, Ser. No. 782,012
Int. Cl. G01f 5/00
U.S. Cl. 73—203                                         8 Claims

ABSTRACT OF THE DISCLOSURE

Apparatus for sensing the rate of fuel flow into an afterburner fuel manifold and energizing ignition apparatus for a predetermined time interval to ignite the afterburner fuel flow when the manifold is filled to a predetermined extent as well as providing a simultaneous output signal to release the gates of a variable area exhaust nozzle downstream from the afterburner.

---

The conventional afterburner ignition apparatus of which I am aware is not entirely satisfactory due to a failure thereof to accurately and reliably sense the extent to which the afterburner fuel manifold is filled with fuel so that the afterburner fuel flow ignition occurs at the optimum afterburner fuel-air ratio. If afterburner fuel ignition does not occur at the proper afterburner fuel-air ratio, a number of undesirable events may occur among which are overfueling or underfueling of the afterburner with resulting ignition failure, incomplete combustion resulting from inadequate flame propagation through the afterburner fuel-air mixture, lack of control over the thrust bump generated as a result of afterburner ignition and waste of significant portions of unburned afterburner fuel.

The abovementioned unsatisfactory operation is, in part, due to the manner in which the conventional apparatus senses the degree of manifold fuel fill which cannot be relied on as an accurate and reliable indication under all conditions of engine operation. For instance, it is common to sense manifold fuel pressure as an indication of the volume of fuel therein. However, an afterburner fuel manifold is normally heated to a relatively high temperature by the hot motive gas flow impinging the same at all times during engine operation with the afterburner inoperative such that, upon initiating afterburner fuel flow to the manifold, the resulting flashing of fuel therein produces excess pressure which cannot be relied on as a true indication of the extent to which the manifold is filled with liquid fuel.

Furthermore, in the case of conventional ignition apparatus of the well-known hot streak ignition type wherein a predetermined excess quantity of fuel injected into the main combustion chamber of the engine passes through the gas turbine in flame form to ignite the afterburner fuel flow the requirement for proper afterburner fuel conditions is extremely important due to the short interval of time during which the hot streak exists. Recycling of the hot streak in the even of afterburner ignition failure may not be immediately available such that, under emergency conditions requiring immediate afterburner operation, the failure may not be rectified in time to avert loss of aircraft and/or human life.

It is, therefore, an object of the present invention to provide afterburner fuel flow sensing and igniting apparatus which is accurate and reliable in operation.

It is another object of the present invention to provide afterburner fuel manifold flow sensing apparatus which is insensitive to pressure conditions in the fuel manifold per se which may provide unreliable pressure signals.

Other objects and advantages of the present invention may become apparent from the following description and accompanying drawings wherein:

Figure 1:
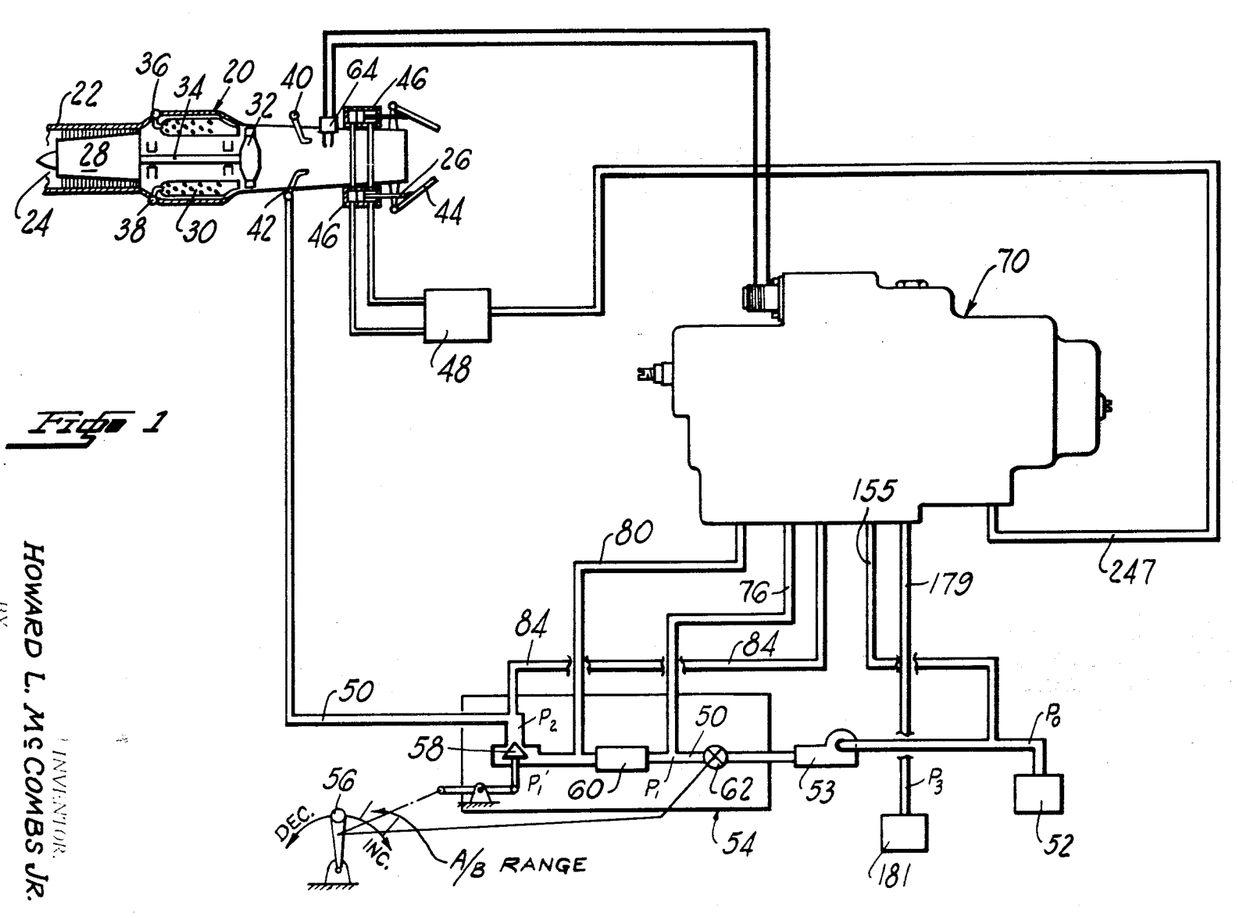
FIG. 1 represents a schematic illustration of a gas turbine engine equipped with an afterburner and variable exhaust nozzle and control system therefore embodying the present invention.

Referring to FIG. 1, numeral 20 designates a conventional aircraft gas turbine engine provided with a casing 22 defining an air inlet 24 and exhaust nozzle 26. Air entering inlet 24 is received by an air compressor 28 and discharged to one or more combustion chambers 30 from which hot motive gas is discharged to a gas turbine 32 which is fixedly secured via a shaft 34 to compressor 28 to rotatably drive the same. Conventional fuel control apparatus, not shown, is connected to supply metered fuel to a fuel manifold 36 having fuel injection nozzles generally indicated by 38 connected to inject fuel into combustion chambers 30. An afterburner fuel manifold 40 in casing 22 downstream from turbine 32 is provided with injection nozzles 42 which spray fuel to the gas exhausted from turbine 32. The resulting afterburner air-fuel mixture is burned to raise the temperature of the gas accordingly and thus increase the propelling thrust derived from the gas which expands through exhaust nozzle 26 to the atmosphere. The effective flow area of exhaust nozzle 26 is controlled by movable gates 44 suitably connected to casing 22 and actuated by motor means generally indicated by 46 in response to output signals generated by a conventional exhaust nozzle control generally indicated by 48 as a function of selected input signals generated by engine operating variable conditions and imposed on exhaust nozzle control 48 as will be recognized by those skilled in the art.

The afterburner fuel manifold 40 is supplied pressurized fuel via a supply conduit 50 leading from a pressurized fuel source 52. An engine driven fuel pump 53 which may be of the centrifugal type is connected to conduit 50 to pressurize the fuel therein. A conventional afterburner fuel meter generally indicated by 54 is responsive to selected engine operating conditions which may include the position of a control lever 56 and is connected to conduit 50 in flow controlling relationship therewith. The afterburner fuel meter 54 may include a variable area metering valve 58 in flow controlling relationship with conduit 50. A wash type filter 60 is disposed in conduit 50 upstream from valve 58. A fuel cut-off valve 62 suitably located in conduit 50 and actuated by control lever 56 serves to establish or disestablish flow through conduit 50 depending upon the position of control lever 56.

The afterburner air-fuel mixture is ignited by conventional ignition means generally indicated by 64 which may include a suitable electric power source 66 connected to energize a spark producing element 68 suitably located in casing 22 to thereby ignite the afterburner air-fuel mixture in response to a control signal derived from afterburner fuel manifold flow sensor and igniter control generally indicated by 70.

It is desirable to ignite the afterburner as soon as possible in response to movement of control lever 56 to a position requesting afterburner operation. However, positive and reliable ignition of the air-fuel mixture cannot be realized until the afterburner fuel manifold 40 is adequately pressurized with fuel thereby ensuring that the fuel injected through nozzles 42 is of sufficient quantity to establish the proper afterburner air-fuel ratio necessary for substantially instantaneous combustion. To that end, the afterburner fuel manifold flow sensor and igniter control 70 senses the quantity of metered fuel flow supplied to the afterburner fuel manifold 40 the known volume of which becomes filled upon receiving a predetermined quantity of fuel thereby pressurizing the fuel injection nozzles 42 to the extent required to establish the desired air fuel ratio for ignition purposes. The control 70 generates an output signal upon sensing the predetermined quantity of metered afterburner fuel flow to energize the ignition means 64 for a predetermined time period to ignite the afterburner air-fuel mixture.

Figure 2:
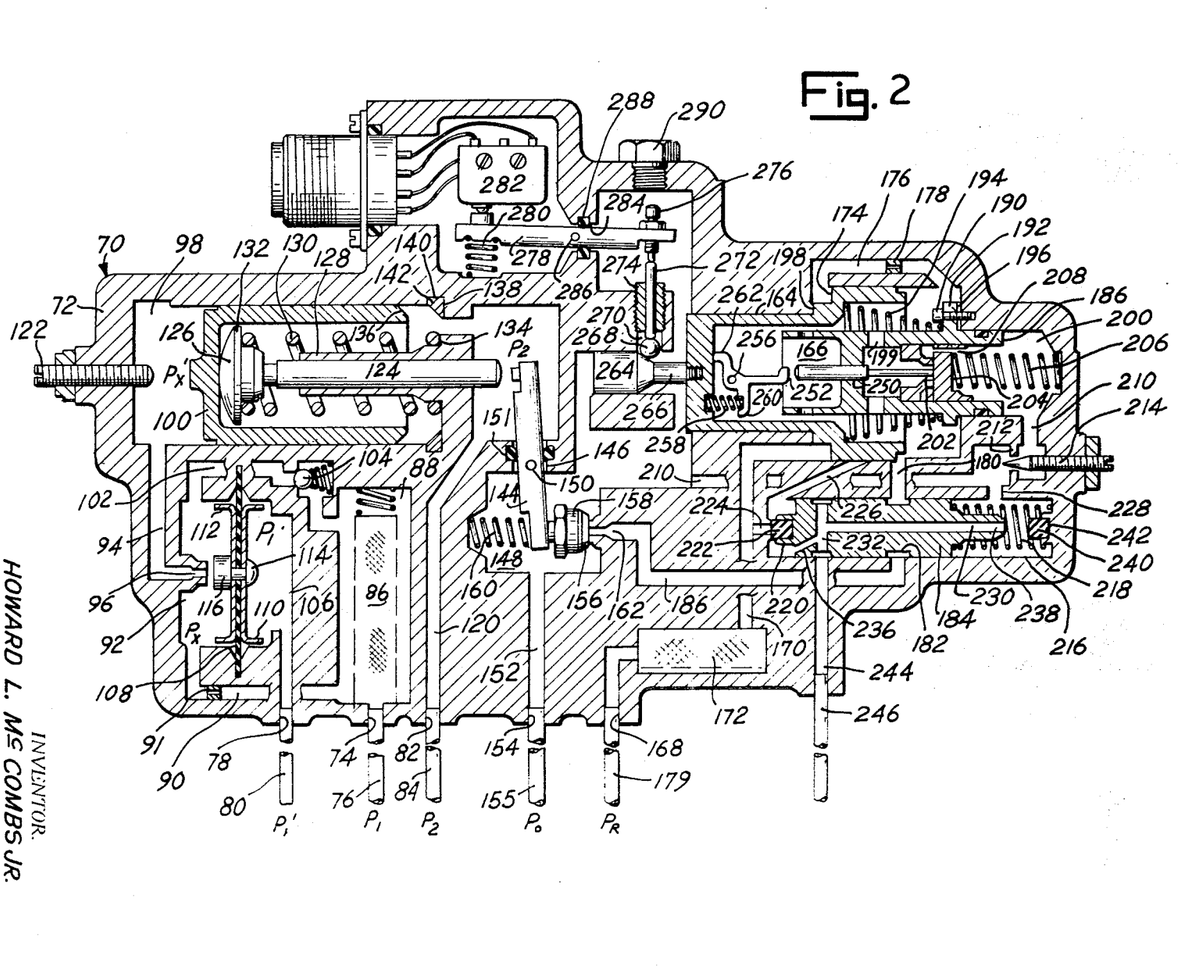
FIG. 2 is a sectional schematic of the afterburner fuel manifold flow sensing and igniter control of FIG. 1 embodying the present invention.

The afterburner fuel manifold flow sensor and igniter control 70 includes a casing 72 having an inlet port 74 connected via a passage 76 to conduit 50 at fuel pressure $P_1$ upstream from filter 60, an inlet port 78 connected via passage 80 to conduit 50 at unmetered fuel pressure $P_1'$ downstream from filter 60 and an inlet port 82 connected via passage 84 to conduit 50 at metered fuel pressure $P_2$ downstream from afterburner fuel meter 54. Fuel at pressure $P_1$ entering casing 72 via port 74 passes through a filter 86 contained by a chamber 88 to a passage 90 containing a restriction 91 and connecting chamber 88 with a chamber 92 then through a passage 94 containing a valve orifice 96 to a chamber 98 partially defined by a piston 100. A passage 102 containing a spring loaded check valve 104 connects chambers 88 and 92 which check valve 104 permits flow only from chamber 92 to chamber 88. Fuel at pressure $P_1'$ entering casing 72 via port 78 passes to a chamber 106 which is separated from chamber 92 by a diaphragm 108. The diaphragm 108 is fixedly secured at its radially outermost portion to casing 72 and is securely clamped between backing plates 110 and 112 by rivet means 114 one portion of which defines a valve element 116. The valve element 116 is adapted to seat against valve orifice 96 in response to movement of diaphragm 108 to control the effective flow area of orifice 96 and thus the flow therethrough accordingly.

The piston 100 is slidably carried in casing 72 and separates chamber 98 from a chamber 118 vented to metered fuel pressure $P_2$ via a passage 120 leading to inlet port 82. Piston 100 is urged into engagement with an adjustable stop 122 threadedly engaged with casing 72 by a spring loaded rod 124 having a curved end portion 126 bearing against piston 100. The rod 124 is slidably mounted for guided movement in a fixed sleeve portion 128 through which the rod 124 extends. A compression spring 130 is interposed between spring retainers 132 and 134 integral with curved end portion 126 and sleeve 128, respectively. As will be described hereinafter, the piston 100 is urged off stop 122 against the resistance of spring 130 by the pressure differential $P_x'-P_2$ generated across piston 100 which moves axially until an annular beveled end portion 136 thereof engages a fixed stop 138 having an annular recessed portion 140 adapted to receive an annular ring seal 142 of resilient material provided with a beveled edge against which the beveled end portion 136 of piston 100 bears to establish a positive fluid seal against leakage from chamber 98 to chamber 118.

The rod 124 is adapted to engage one end of a circular lever 144 which extends through an opening 146 in casing 72 separating chamber 118 from a chamber 148 and is mounted for pivotal movement on a pin 150 secured to casing 72. The opening 146 is larger than lever 144 to permit a limited range of pivotal movement of lever 144 on pin 150. An O ring 151 suitably secured in a recess in casing 72 provides a resilient seal against fuel leakage between adjacent surfaces of opening 146 and lever 144. The one end of lever 144 extends into chamber 148 which is vented via a passage 152 to an outlet port 154 in casing which, in turn, is vented via a passage 155 to a suitable drain source at relatively low fluid pressure $P_o$ such as conduit 50 at the inlet to pump 53. A half ball servo valve 156 actuated by lever 144 is carried by an adjustable retaining member 158 which is threadedly engaged with the end of lever 144. A spring 160 interposed between casing 72 and lever 144 preloads lever 144 thereby urging half ball valve 156 against a valve orifice 162 to close the same.

A stepped diameter piston 164 slidably carried in casing 72 separates chamber 148 from a chamber 166. Chamber 166 is vented to receive fuel at regulated substantially constant pressure $P_r$ from an inlet port 168 via a passage 170 containing a filter 172, an annulus 174 partially deformed by the intermediate step of piston 164 and a passage 176 containing a restriction 178. The inlet port 168 is connected via passage 179 to a suitable source 181 of fuel at regulated constant pressure $P_r$. Chamber 166 discharges fuel to chamber 148 via a passage 180, an annulus 182 formed in a valve 184 slidably carried in casing 72, and a passage 186 having valve orifice 162 connected to the discharge end thereof. Flow through passage 180 is interrupted by the large diameter portion of piston 164 which slides axially to cover the one end of passage 180 thereby blocking communication between chamber 166 and passage 180. Flow through passage 180 is also interrupted by the valve 184 which slides axially carrying annulus 182 out of registration with the adjacent end of passage 180 thereby blocking the same.

A tubular member 186 having a transverse wall 188 is fixedly secured to casing 72 by any suitable means such as a plurality of bolts 190 passing through flanged portion 192 thereof into threaded engagement with casing 72. The tubular member 186 is axially aligned with piston 164 which is adapted to slide over the member 186 to the extent permitted by the large diameter end of piston 164 which may abut a fixed stop 196 defined by casing 72. A compression spring 194 interposed between flanged portion 192 and piston 164 applies a preload against the latter to seat the same against suitable stop means 198 defined by casing 72.

The chamber 166 is vented to the interior of tubular member 186 via a passage 199 in the wall thereof which interior is vented to a chamber 200 at fuel pressure $P_o$ via a valve orifice 202 fixedly secured by any suitable means such as a press fit to the inner wall of tubular member 186 in spaced axial relationship to wall 188. A valve 204 slidably carried in tubular member 186 is urged into seating engagement on orifice 202 by a compression spring 206 interposed between casing 72 and valve 204 to thereby close orifice 202. Fuel at pressure $P_{xt}$ passing through open orifice 202 passes through valve 204 via a passage 208 connecting opposite faces thereof. The chamber 200 is vented to chamber 148 via a passage 210 containing a variable area flow restriction 212 the effective area of which is established by an adjustable valve 214 threadedly engaged with casing 72.

The valve 184 is slidably carried in a chamber 216 and biased in one direction axially by a compression spring 218 interposed between casing 72 and one end of valve 184. The opposite end of valve 184 is provided with a recess 220 containing a resilient seal member 222 adapted to seat against a valve orifice 224 leading from chamber 216 to passage 170. A passage 226 is adapted to vent one end of chamber 216 to passage 170 at regulated pressure $P_r$ depending upon the position of piston 164 the large diameter portion of which slides relative to passage 226 to establish or disestablish flow therethrough. The opposite end of chamber 216 is vented via a passage 228 to passage 210 at pressure $P_o$. The opposite ends of chamber 216 communicate via an axial passage 230, a radial passage 232 which terminates in an annulus 234, and a passage 236 formed in valve 184. The valve 184 is provided with a valve orifice 238 at one end of axial passage 230 which valve orifice is adapted to seat against a resilient seal member 240 contained by a recess 242 in casing 72 to block flow through passage 230 when valve 184 is pressurized to the right in a manner to be described. The annulus 234 in the position of valve 184 shown communicates with a passage 244 in casing 72 leading to an outlet port 246 which, in turn, is connected via passage 247 to exhaust nozzle control 48.

Referring back to tubular member 186 and the valve 204 slidably carried therein, the valve 204 is provided with a stem or rod portion 248 integral therewith and extending axially therefrom through valve orifice 202 into sliding engagement with an opening 250 in transverse wall 188. The end of stem 248 is adapted to be engaged by an abutment 252 defined by one arm of a pawl member 254 pivotally carried on a pin 256 which, in turn, is secured to piston 164. A compression spring 258 interposed between the closed end of piston 164 and an arm 260 of pawl member 254 serves to resiliently load the latter causing an arm 262 thereof to engage piston 164 thereby aligning stop 252 with stem 248. The arm 260 is adapted to be engaged by tubular member 186 as piston 164 moves relative thereto to pivot pawl member 254 causing stop 252 to disengage stem 248.

A stem or rod portion 264 threadedly engaged at one end to piston 164 extends axially therefrom into sliding engagement with casing 72 and is provided with a cam portion 266. A cam follower defined by a ball 268 retained in a recess 270 partially defined by casing 72 bears against cam portion 266 which is adapted to urge ball 268 radially outwardly therefrom into engagement with one end of pin 272 slidably carried in a guide 274 threadedly engaged with casing 72. The opposite end of pin 272 engages an adjustable member 276 threadedly engaged with one end of a lever 278 to thereby pivot lever 278 against the resistance of a compression spring 280 interposed between the opposite end of lever 278 and casing 72. The lever 278, in turn, simultaneously actuates two electrical switches generally indicated by 282 which, in turn, are wired to provide an electrical input signal to the afterburner igniter apparatus.

The lever 278 extends through an opening 284 in casing 72 and is pivotally mounted for limited movement on a pin 286 suitably secured to casing 72. An O ring seal 288 suitably carried in the wall of opening 284 serves as a resilient seal against fluid leakage between fuel at pressure $P_o$ and air at atmosphere pressure on opposite sides of opening 284. A plug 290 threadedly engaged with casing 72 provides for access to adjustable member 276 for calibration purposes.

OPERATION

Referring to FIG. 1, it will be understood that the various control fuel pressures within the casing 72 do not differ to any substantial degree and are at a relatively low value as a result of the control lever 56 being in a non-afterburning or "dry engine" position.

Referring to FIG. 2, it will be assumed that the control lever 56 is actuated to a position requesting afterburning or "wet engine" operation. The afterburner fuel cut-off valve 62 opens accordingly to permit fuel at pump discharge pressure $P_1$ to pass through conduit 50 to metering valve 58 which occupies a predetermined position as a function of the engine operating conditions including position of control lever 56 thereby establishing the effective flow area of conduit 50 and thus metered fuel flow to the afterburner manifold 40. The fuel passes through filter 60 undergoing a drop from pressure $P_1$ to $P_1'$ and then through metering valve 58 undergoing a corresponding pressure drop from $P_1'$ to $P_2$.

Figure 3:
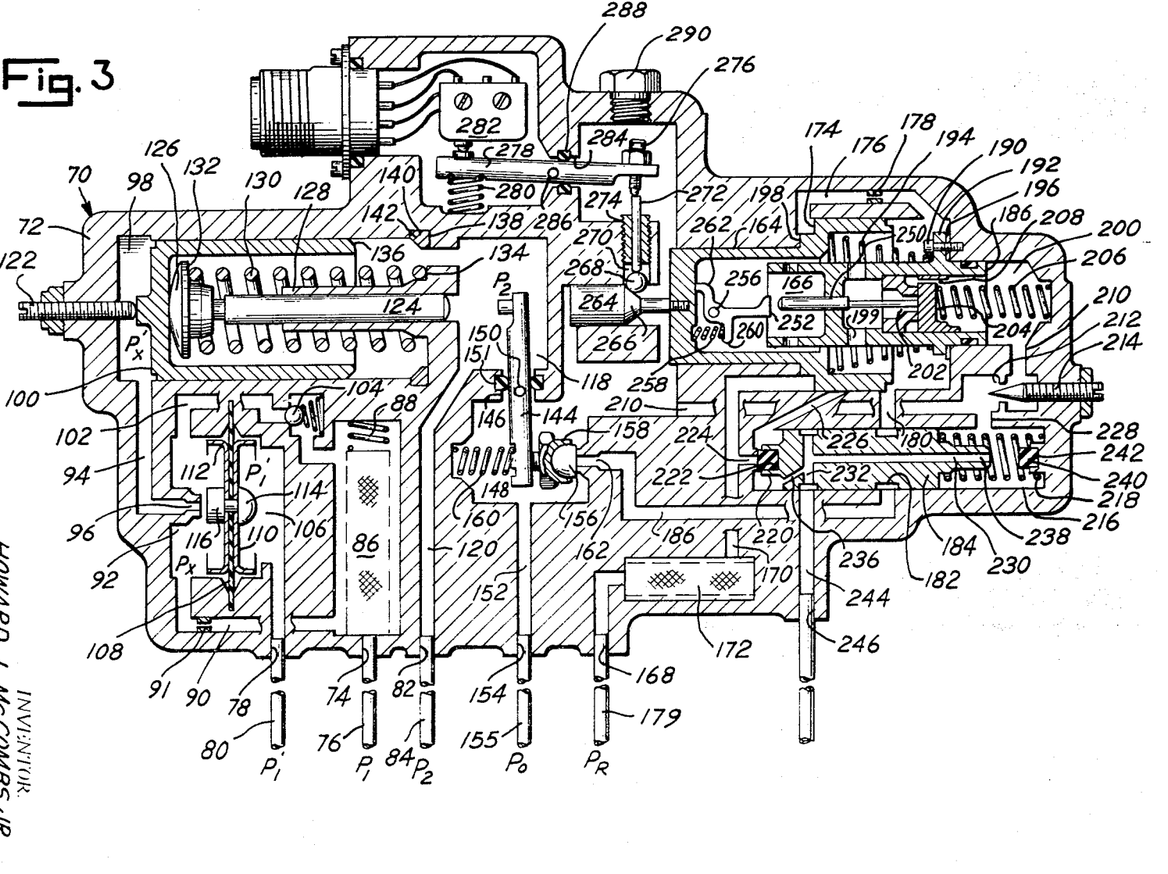
FIG. 3 is a sectional schematic similar to FIG. 2 but showing the positions assumed by the various component portions thereof during fuel manifold filling operation.

Fuel at pressure $P_1$ enters chamber 88 where it is filtered and subsequently passes through metering restriction 91 to chamber 92 then through orifice 96 and passage 94 to chamber 98. Fuel at pressure $P_1'$ enters chamber 106 where it acts against diaphragm 108 in opposition to pressure $P_x$ generated in chamber 92 which diaphragm 108, in turn, positions valve 116 to throttle flow through orifice 96 and regulate the fuel pressure $P_x$ in chamber 92 to equal fuel pressure $P_1'$. The pressure drop $P_1-P_x$ across the metering orifice 96 is equal to the pressure drop $P_1-P_1'$ across the filter 60 which establishes a flow through metering restriction 91 and thus through orifice 96 to chamber 98 in direct proportion to the flow through conduit 50 to fuel manifold 40. The piston 100 responds to the pressurized flow into chamber 98 and moves to the right against the spring 130 augmented by the force of pressure $P_2$ acting against piston 100 with a velocity directly proportional to the flow into chamber 98 (see FIG. 3). Since all of the flow through metering restriction 91 passes to chamber 98, the piston 100 moves until the end portion 136 thereof engages seal 142 on stop 138 which occurs when a known quantity of metered fuel has passed through restriction 91. Thus, the piston 100 acts as a flow measuring device. The relationship of the flow through metering restriction 91 and the flow through conduit 50 to the fuel manifold is directly proportional to the flow area relationship between the restriction 91 and the filter 60. For example, assume the metering area of restriction 91 is 5.0% of the effective area of filter 60 and the total displacement of piston 100 is 5.0% of the volume of fuel manifold 40. With the fuel manifold 40 empty at the time of opening cut-off valve 62, the piston 100 will be displaced from stop 122 to stop 138 during the time fuel manifold 40 is filled with the piston 100 engaging stop 138 at the same time manifold 40 becomes 100% filled. The stop 122 may be adjusted to establish the starting position of piston 100 which, in turn, determines the effective displacement thereof and thus the quanity of flow into chamber 98 to fully displace piston 100 against stop 138. With piston 100 fixed against stop 138, flow into chamber 98 ceases, causing pressures $P_x'$ in chamber 98 as well as $P_x$ in chamber 92 to rise to pressure $P_1$. The resulting $P_1-P_1'$ across diaphragm 108 urges diaphragm 108 toward chamber 106 causing valve 116 to fully open and plate 110 to engage casing 72 thereby preventing flexing of diaphragm 108 beyond its capabilities.

Figure 4:
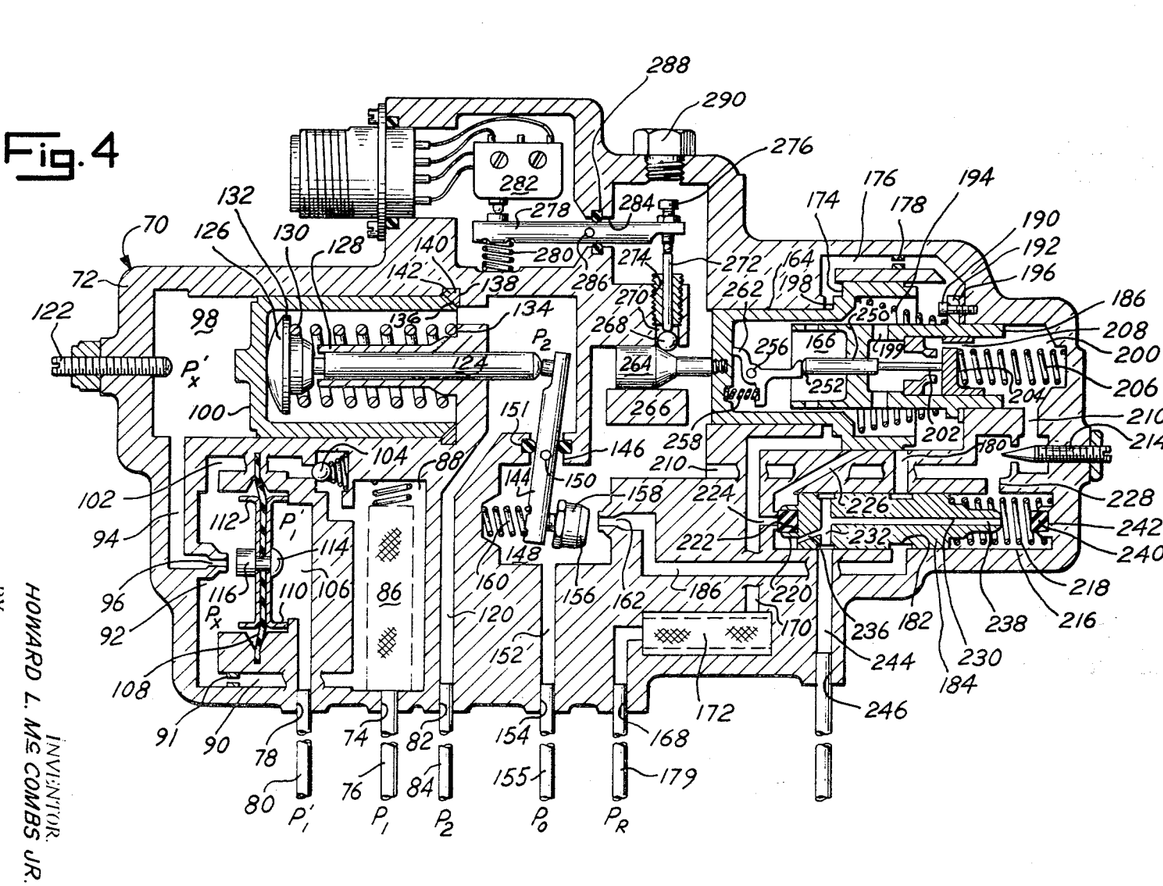
FIG. 4 is a sectional schematic similar to FIG. 2 but showing the positions assumed by the various component portions thereof during a first cycle of afterburner ignition operation.

With the fuel manifold 40 filled, the afterburner fuel ignition mechanism is set in operation (see FIG. 4). To that end, as piston 100 approaches stop 138, the rod 124 which follows piston 100 engages the end of lever 144 causing clockwise movement thereof as viewed in FIG. 4 which, in turn, lifts valve 156 off orifice 162 thereby venting passage 186 to chamber 148 at pressure $P_o$. The resulting drop in pressure $P_{xt}$ in chamber 166 intermediate restriction 178 and orifice 162 allows piston 164 to move off stop 198 against the resistance of spring 197 under the influence of pressure $P_r$ acting against the stepped portion of piston 164 defining annulus 174. Continued movement of piston 164 results in engagement of pawl abutment 252 with stem 248 and movement of cam portion 264. The cam portion 264 urges follower ball 268 into engagement with pin 272 which, in turn, is driven axially into engagement with member 276 carried by lever 278 causing lever 278 to pivot counterclockwise and actuate switches 282 to a closed position to thereby energize the electrical igniter of the afterburner.

Figure 5:
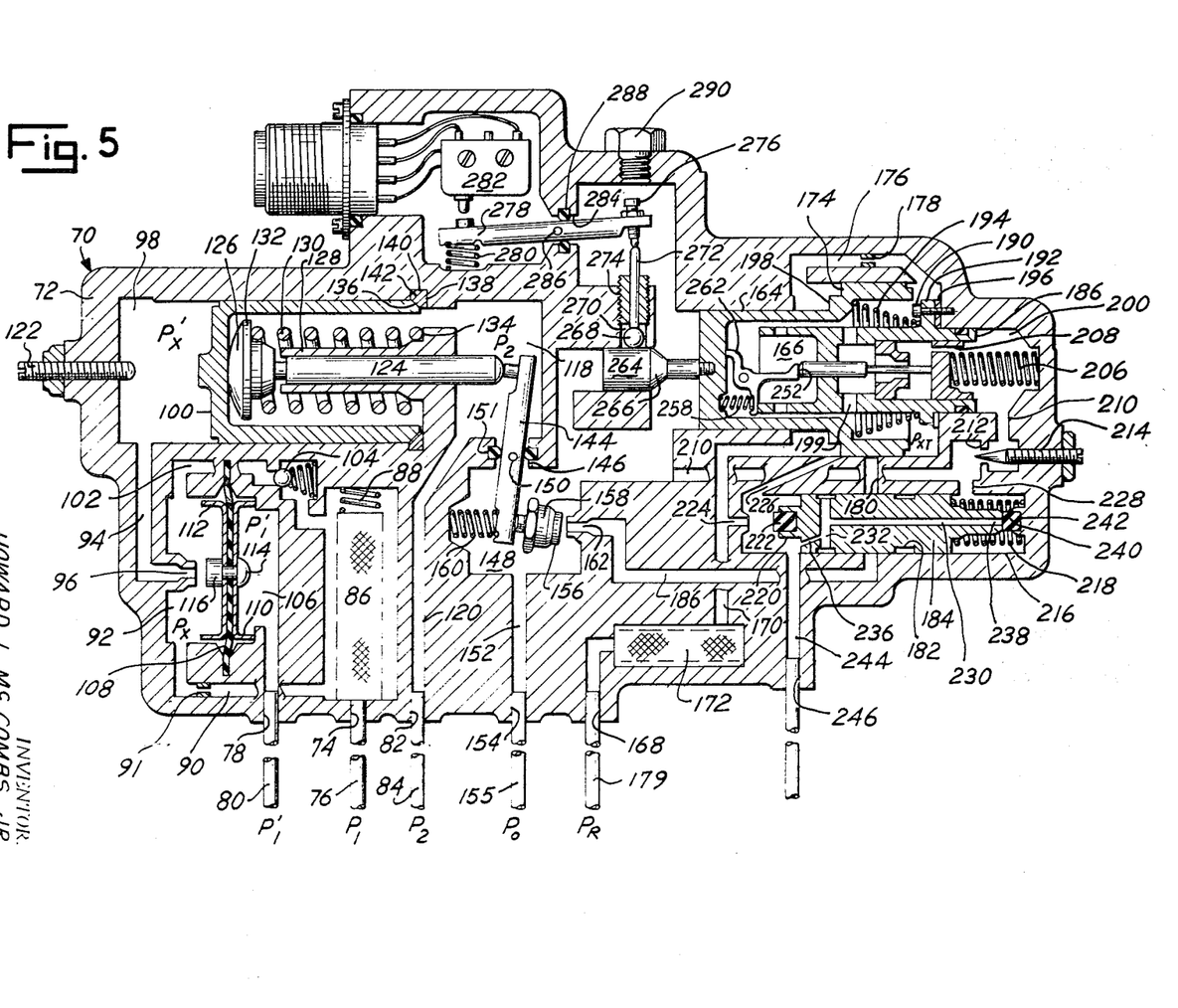
FIG. 5 is a sectional schematic similar to FIG. 2 but showing the positions assumed by the various component portions thereof during a second cycle of afterburner ignition operation.

The electrical igniter remains energized for a predetermined time interval as a result of control over the flow out of chamber 166 via the adjustable orifice 214 (see FIG. 5). To that end, the movement of piston 164 results in the large diameter portion of piston 164 sliding over the adjacent end of passage 180 to block the same immediately after engagement of pawl abutment 252 with stem 248. The abutment 252 drives stem 248 and attached piston 204 against the resistance of spring 206 thereby opening orifice 202 to vent chamber 166 to chamber 200 from which flow is controlled by adjustable orifice 212 in passage 210 leading to chamber 148 at pressure $P_o$. The effective flow area of orifice 212 established by the setting of adjustable valve 214 determines the flow out of chamber 166 upon which the velocity of piston 164 is dependent. Thus, the time interval required by the piston 164 to complete its stroke may be varied as desired to maintain the afterburner igniter energized. As the piston 164 continues to move, the arm 260 of pawl 254 engages tubular member 186 which urges pawl 254 clockwise moving abutment 252 out of contact with stem 248 allowing piston 204 to move against orifice 202 under the influence of spring 206 thereby blocking flow out of chamber 166 causing the pressure $P_{xt}$ therein to rise accordingly. The rise in pressure $P_{xt}$ in chamber 166 causes piston 164 to stop and reverse in motion and subsequently engage stop 198. The cam portion 266 carried by piston 164 moves accordingly to allow follower ball 268 and pin 272 to drop and permit lever 278 to pivot clockwise under the influence of spring 280 thereby opening switches 282 which, in turn, de-energizes the afterburner igniter (see FIG. 6).

As the piston 164 is activated against spring 197 during the timed ignition process, a pressure signal is generated to release the exhaust nozzle gates 44 in accordance with afterburning requirements (see FIG. 5). To that end, the one end of passage 226 is uncovered by the trailing edge of the large diameter portion of piston 164 as the piston approaches the limit of its travel to the right as viewed in FIG 5. Fuel at pressure $P_r$ is vented through passage 226 to the left-hand end chamber 216 where it acts against valve 184 driving the same against the resistance of spring 218 thereby causing orifice 238 to seat against seal member 240 to isolate passage 230 from the right-hand end of chamber 216 at pressure $P_o'$. The annulus 182 in valve 184 moves out of communication with passages 180 and 186 thereby blocking the same. Fuel at pressure $P_r$ passes through orifice 224 which is fully open to the left-hand end of chamber 216 thereby providing a source of pressure $P_r$ in parallel to passage 226. The annulus 234 in valve 184 moves out of communication with passage 244 which is subsequently vented past the traveling edge of valve 184 to the left-hand end of chamber 216 at pressure $P_r$ thereby establishing a pressure $P_r$ signal at port 246 which is transmitted via passage 247 to exhaust nozzle control 48 to effect release of the nozzle gates 44.

Figure 6:
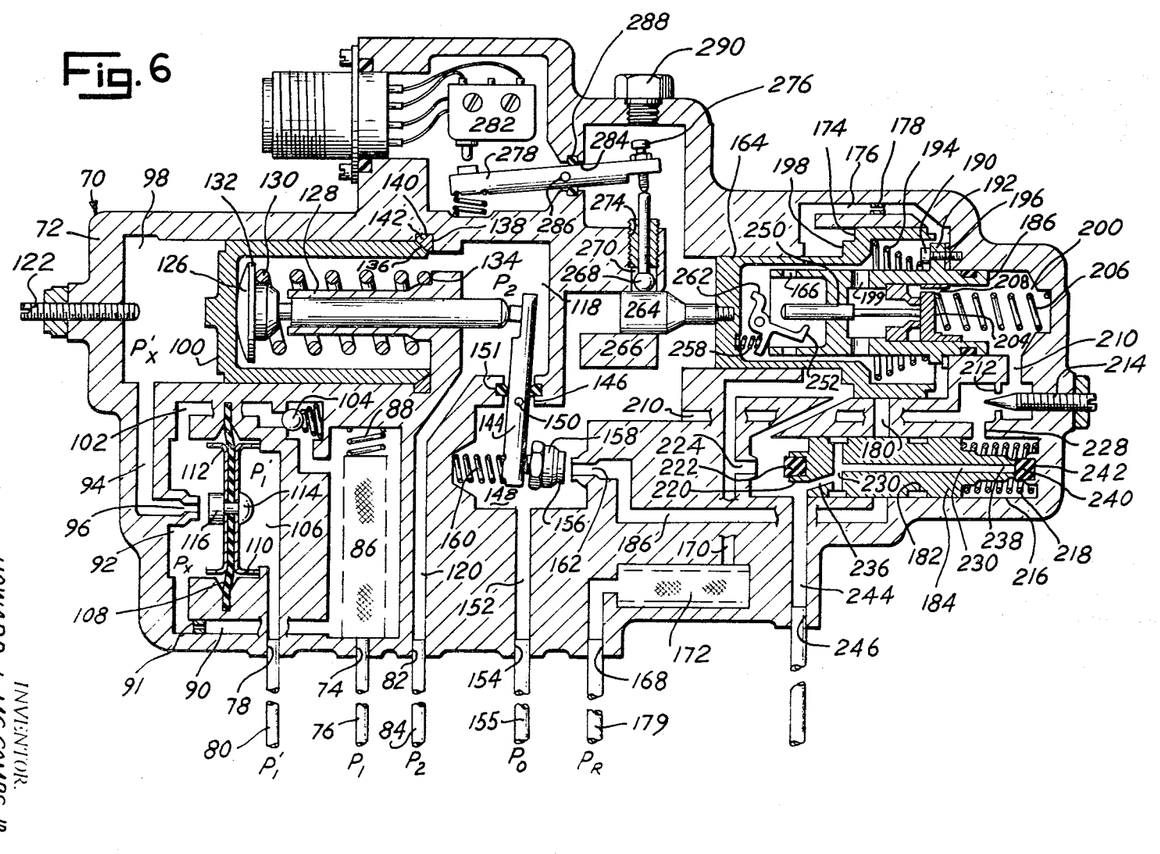
FIG. 6 is a sectional schematic similar to FIG. 2 but showing the positions assumed by the various component portions thereof subsequent to ignition of the afterburner.

When the piston 164 reverses its direction of movement and moves back toward stop 198, the valve 184 remains pressurized to the right by pressure $P_r$ (see FIG. 6). It will be noted that the passage 226 is blocked by the large diameter portion of piston 164 as the piston moves on its return stroke thereby isolating passage 226 from passage 170 at pressure $P_r$. However, the left-hand end of chamber 216 is vented to pressure $P_r$ via orifice 224 which maintains valve 184 in the biased position against seal member 240.

Figure 7:
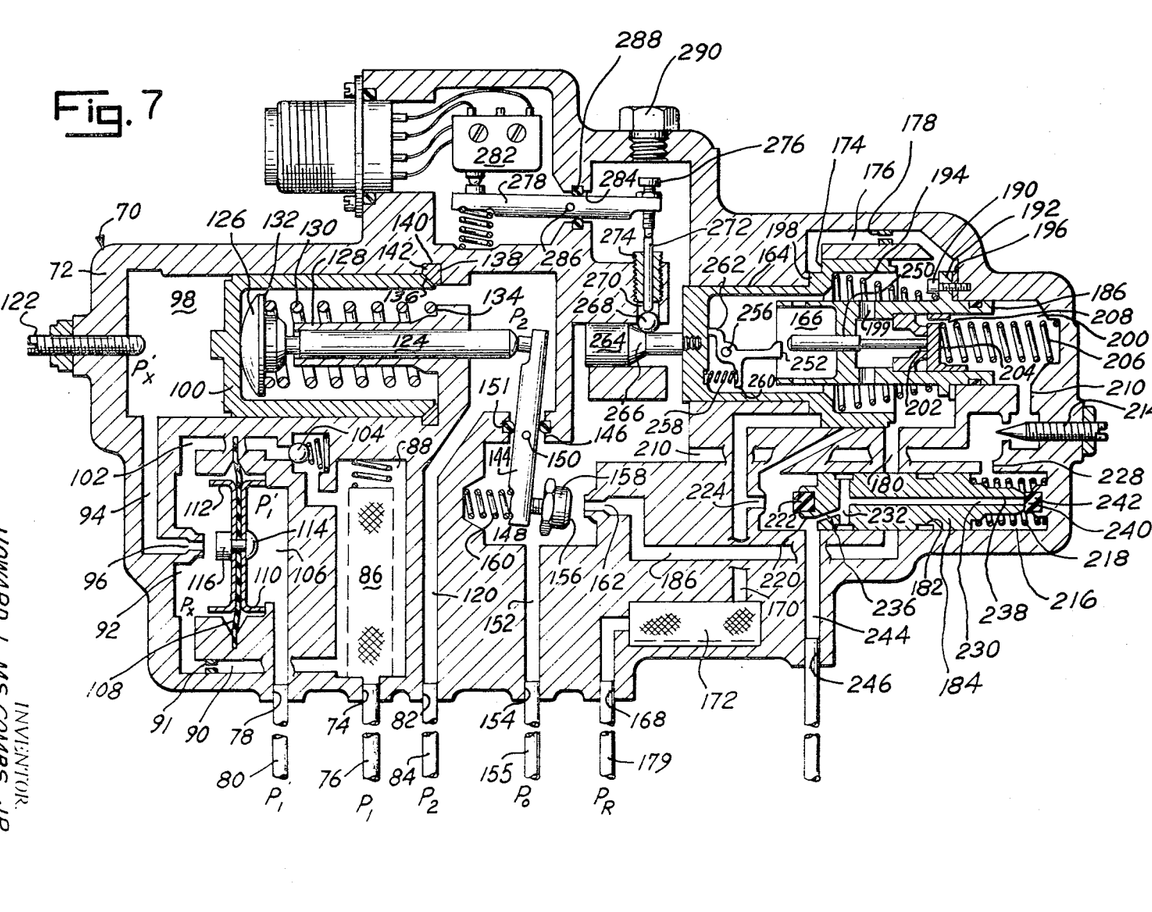
FIG. 7 is a sectional schematic similar to FIG. 2 but showing the positions assumed by the various component portions thereof during afterburner operation.

FIG. 7 illustrates the positions occupied by the various component members upon completion of the heretofore described afterburner ignition cycle. It will be noted that piston 100 remains pressurized against stop 138 by the $P_1 - P_2$ pressure differential existing thereacross. Any tendency for leakage of the relatively high pressure fuel at pressure $P_1$ past piston 100 to chamber 118 at pressure $P_2$ is resisted by the seal 142 which becomes more positive as the pressure differential $P_1 - P_2$ increases.

Figure 8:
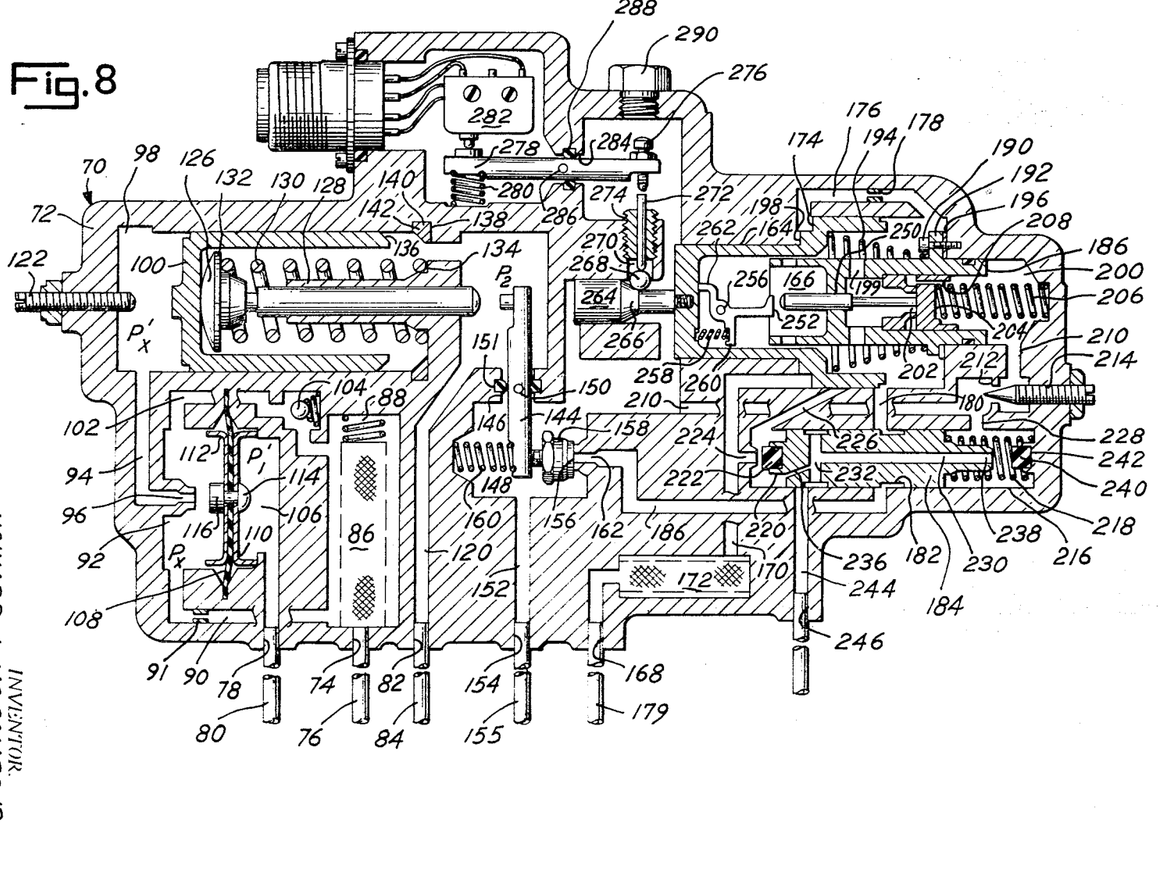
FIG. 8 is a sectional schematic similar to FIG. 2 but showing the positions assumed by the various component portions thereof following afterburner shut down.

Referring to FIG. 8, the piston 100 is returned to its position against stop 122 by actuating control lever 56 to a non-afterburning or "dry" engine position. Assuming the control lever 56 is actuated to a "dry" engine position, the cut-off valve 62 is closed accordingly, whereupon the fuel pressures in chamber 118, 88, 106, 92 and 98 equalize. The spring 130 urges piston 100 toward stop 122 whereupon fuel in chamber 98 is forced through orifice 96 to chamber 92. The time required for piston 100 to move into engagement with stop 122 is minimized by the check valve 104 which opens to vent chamber 92 to chamber 88 in parallel flow relationship with metering restriction 91 As the piston 100 returned to stop 122, the stem 124 becomes disengaged with lever 144 allowing spring 160 to bias lever 144 in a direction to close valve 156.

When the control lever 56 is reset in the abovementioned manner to discontinue afterburner operation, the valve 184 is caused to return to its position to the left where seal 222 engages orifice 224. To that end, movement of control lever 56 causes port 168 to be vented from regulated pressure $P_r$ to relatively low pressure $P_o$. The resulting drop in pressure in chamber 216 adjacent orifice 224 permits valve 184 to move to the left under the influence of spring 218 thereby urging seal 222 into engagement with orifice 224 to block the same. The right-hand end of chamber 216 being vented to pressure $P_o$ via passages 228 and 210 communicates with the left-hand end of chamber 216 via passages 230, 232 and 236 thereby balancing the pressures across valve 184 as well as reducing the pressure signal at port 246 from $P_r$ to $P_o$ by virtue of the annulus 234 communicating passage 232 with passage 244.

Figure 9:
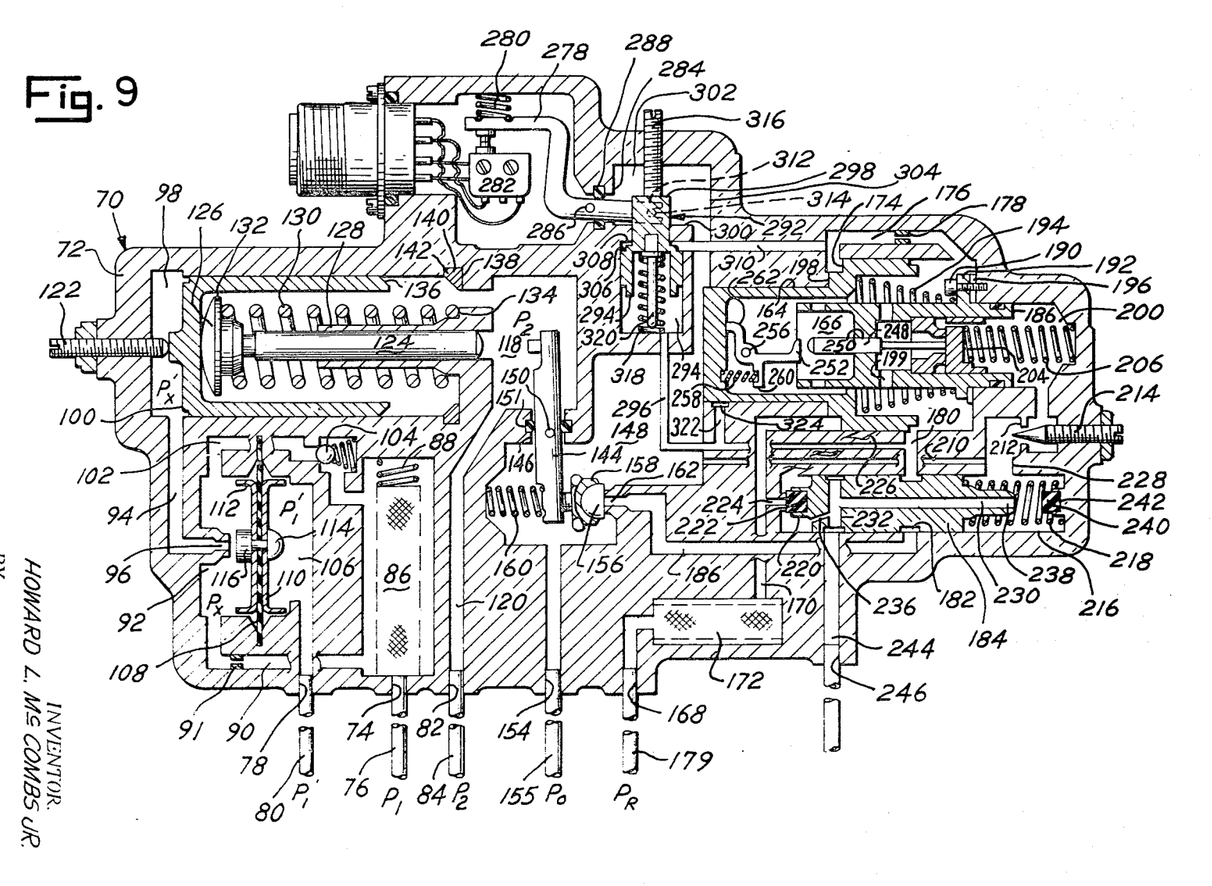
FIG. 9 is a sectional schematic similar to FIG. 1 but showing a modified form of a portion thereof.

Referring to FIG. 9, it may be undesirable to use a mechanical cam and follower such as cam portion 266, follower ball 268 and pin 272 to actuate the switches 282 for reasons apparent to those skilled in the art. If desired, the switches 282 may be actuated by fuel servo operated mechanism as indicated in FIG. 9 wherein a portion of the afterburner fuel manifold flow sensing and igniter control 70 is broken away to show the modified portion thereof. The remaining portion of the control 70 is identical to that shown in FIGS. 1 through 8.

Referring to FIG. 9, a stepped diameter piston 292 is provided with a large diameter portion 294 slidably carried in a chamber 294 which is vented via a passage 296 to passage 180. The small diameter portion 298 of piston 292 extends through an end wall 300 of chamber 294 into a chamber 302 vented to chamber 148 at pressure $P_o$ via a passage 304. A transverse annular section 306 between the large and small diameter portions of piston 292 is vented via an annulus 308 and passage 310 to passage 176 upstream from restriction 178. The lever 278 is provided with a slotted end 312 pivotally mounted on a pin 314 secured to the small diameter portion 298 of piston 292. An adjustable stop 316 threadedly engaged with casing 72 is engaged by the small diameter portion 298 under the influence of a compression spring 318 interposed between one end of chamber 294 and piston 292. The piston 292 is limited in movement in the opposite direction by a stop member 320 fixedly secured to piston 292 and adapted to engage the end wall of chamber 294.

The passage 296 is vented via a passage 322 to a port 324 in the wall of chamber 166 which port 324 is adapted to be blocked or vented to chamber 148 depending upon the position of piston 164 as will be described.

The operation of FIG. 9 is best described in relation to FIG. 2 through 8 and the sequence of movement of piston 164 associated therewith. Beginning with the afterburner-fuel manifold flow sensor and igniter 70 in the non-afterburning or "dry" engine condition as represented by FIG. 2, the piston 292 is pressurized against stop 316 by fuel at pressure $P_r$ in chamber 294 which augments spring 318 in opposition to the relatively smaller force generated by pressure $P_r$ acting against transverse section 306. It will be noted that chamber 294 is vented to pressure $P_r$ by virtue of the piston 164 blocking port 324 thereby preventing communication of passage 296 at pressure $P_r$ with chamber 148 at relatively lower pressure $P_o$.

Referring to FIG. 4, as the piston 164 is pressurized against spring 197 causing the large diameter portion of piston 164 to slide over the adjacent end of passage 180, the trailing edge of the smaller diameter portion of piston 164 subsequently uncovers port 324 to vent passage 296 to chamber 148 at pressure $P_o$. It will be understood that the spacing of passage 180 and port 324 is such that piston 164 closes passage 180 before opening port 324. The resulting drop in fuel pressure to $P_o$ in chamber 294 allows pressure $P_r$ acting against transverse section 306 to overcome spring 318 driving piston 292 until stop member 320 engages casing 72. The lever 278 follows piston 292 to activate switches 282 to an open position thereby energizing the afterburner igniter.

As described in connection with FIGS. 5 and 6, the afterburner igniter remains energized for a predetermined time interval and is de-energized upon reverse motion of piston 164. To that end, reverse motion of piston 164 results in the small diameter portion of piston 164 sliding over port 324 to block the same in advance of the larger diameter portion of piston 164 sliding over the end of passage 180 to open the same whereupon the pressure in passage 296 and thus chamber 294 rises to pressure $P_r$ causing piston 292 to move against stop 316 which, in turn, results in movement of lever 278 to activate switches 282 to a closed position thereby de-energizing the afterburner igniter.

While my invention is described in a preferred embodiment for use with afterburner fuel flow sensing and igniting purposes, it will be recognized that it may be readily adapted for use in any system where it is desired to accurately sense a predetermined quantity of a first metered flow and subsequently provide a control signal of predetermined timed duration to control a second flow as, for example, in fluid batch processing.

I claim:
1. Fluid flow responsive apparatus for measuring a flow of pressurized fluid through a conduit to a receiver, said flow responsive apparatus comprising:
   flow restricting means in series flow relationship with said conduit;
   means defining a variable volume chamber;
   displaceable pressurized fluid flow responsive means in said chamber;
   passage means communicating said chamber with said conduit upstream from said flow restricting means;
   a metering restriction having a predetermined effective flow area relative to the flow area of said flow restricting means in said passage means for controlling fluid flow therethrough;
   valve means operatively connected to said passage means for controlling the fluid pressure differential across said metering restriction; and
   fluid pressure responsive means operatively connected to said valve means and responsive to the fluid pressure differential across said flow restricting means for controlling said valve means to establish a common pressure differential across said metering restriction and said flow restricting means;
   said displaceable flow responsive means being responsive to the pressurized fluid flow through said passage means to said chamber and displaceable as a known function of the rate of fluid flow through said metering restriction.

2. Fluid flow responsive apparatus as claimed in claim 1 wherein: said displaceable pressurized fluid flow responsive means is a piston slidably carried in said chamber.

3. Fluid flow responsive apparatus as claimed in claim 1 wherein:
   said metering restriction has a predetermined fixed flow area; and
   said valve means is downstream from and in series flow relationship with said metering restriction.

4. Fluid flow responsive apparatus as claimed in claim 1 and further including:
   adjustable stop means; and
   spring means operatively connected to said fluid pressure responsive means for urging the same into engagement with said stop means to thereby establish a predetermined minimum volume of said variable volume chamber.

5. Fluid flow responsive apparatus as claimed in claim 4 and further including: second stop means adapted to be engaged by said fluid pressure responsive means for limiting the response thereof to said pressurized flow into said chamber.

6. Fluid flow responsive apparatus as claimed in claim 5 and further including:
   a normally closed spring loaded check valve connected in parallel flow relationship with said metering restriction and responsive to a predetermined pressure differential thereacross resulting from reverse flow therethrough;
   said check valve being actuated to an open position to vent fluid from said passage means during retraction of said fluid pressure responsive means from said second stop means to said adjustable stop.

7. Fluid flow responsive apparatus as claimed in claim 1 and further including: output signal generating means operatively connected to said displaceable flow responsive means and actuated thereby to produce an output signal of predetermined duration following displacement of said displaceable flow responsive means to a predetermined position.

8. Fluid flow responsive apparatus as claimed in claim 1 wherein: said fluid flow through said passage means is proportional to the fluid flow through said conduit.

References Cited

UNITED STATES PATENTS

| 2,892,346 | 6/1959 | Sargent | 73—194 |
| 3,234,785 | 2/1966 | Rimsha | 73—113 |
| 3,463,004 | 8/1969 | Withnell | 73—232 |

JERRY W. MYRACLE, Primary Examiner

U.S. Cl. X.R.
60—39.82 R, 242